United States Patent
Wu et al.

(10) Patent No.: US 9,683,653 B2
(45) Date of Patent: Jun. 20, 2017

(54) COMBINED TRANSMISSION SHAFT AND ROTATING DEVICE HAVING COMBINED TRANSMISSION SHAFT

(71) Applicant: INDUSTRIAL TECHNOLOGY RESEARCH INSTITUTE, Hsinchu (TW)

(72) Inventors: Ching-Huei Wu, Zhubei (TW); Tien-Hsi Tai, Hsinchu (TW); Chang-Chia Hsieh, Taichung (TW); Min-Chang Wu, Hsinchu County (TW); Sheng-Feng Tsai, Hsinchu County (TW); Ming-Ju Wu, Hsinchu (TW)

(73) Assignee: INDUSTRIAL TECHNOLOGY RESEARCH INSTITUTE, Hsinchu (TW)

( * ) Notice: Subject to any disclaimer, the term of this patent is extended or adjusted under 35 U.S.C. 154(b) by 273 days.

(21) Appl. No.: 14/582,502

(22) Filed: Dec. 24, 2014

(65) Prior Publication Data

US 2016/0108991 A1  Apr. 21, 2016

(30) Foreign Application Priority Data

Oct. 15, 2014  (TW) .............................. 103135705 A

(51) Int. Cl.
| | | |
|---|---|---|
| *F16H 57/12* | (2006.01) | |
| *F16H 1/16* | (2006.01) | |
| *F16H 55/24* | (2006.01) | |

(52) U.S. Cl.
CPC ............. *F16H 57/12* (2013.01); *F16H 1/166* (2013.01); *F16H 55/24* (2013.01); *F16H 2057/125* (2013.01); *F16H 2057/127* (2013.01)

(58) Field of Classification Search
CPC .......... F16H 57/12; F16H 1/166; F16H 55/24; F16H 2057/127; F16H 2057/125
See application file for complete search history.

(56) References Cited

U.S. PATENT DOCUMENTS

| | | | | |
|---|---|---|---|---|
| 2,786,360 A | * | 3/1957 | Cameron ................. | B23Q 5/56 74/409 |
| 4,036,074 A | | 7/1977 | Bodnar | |
| (Continued) | | | | |

FOREIGN PATENT DOCUMENTS

| | | |
|---|---|---|
| CN | 102172848 A | 9/2011 |
| TW | 568812 | 1/2004 |
| (Continued) | | |

OTHER PUBLICATIONS

Taiwan Patent Office, Office Action, Patent Application Serial No. TW103135705, Dec. 2, 2015, Taiwan.
(Continued)

*Primary Examiner* — Victor MacArthur
(74) *Attorney, Agent, or Firm* — Rabin & Berdo, P.C.

(57) ABSTRACT

A rotating device includes a rotating disc and a combined transmission shaft. The rotating disc includes a turret and multiple driven rollers. The combined transmission shaft includes a first roller gear cam and a second roller gear cam. The first roller gear cam includes a first shaft, a combined shaft and a first helical tooth. The combined shaft protrudes outward from a side of the first shaft. The first shaft is surrounded by the first helical tooth and has a first outer surface and a first inner surface. The second roller gear cam includes a second shaft and a second helical tooth. The second shaft has a combination hole. The second shaft is surrounded by the second helical tooth and has a second outer surface and a second inner surface. The combined shaft passes through the combination hole.

20 Claims, 7 Drawing Sheets

(56) References Cited

U.S. PATENT DOCUMENTS

| | | | |
|---|---|---|---|
| 4,473,317 A | 9/1984 | Bolang | |
| 6,386,059 B1* | 5/2002 | Mittendorf, Jr. | F16H 1/16 74/409 |
| 7,603,930 B2 | 10/2009 | Kato et al. | |
| 7,793,567 B2 | 9/2010 | Kato | |
| 2002/0138959 A1* | 10/2002 | Kato | B23Q 1/38 74/813 R |
| 2002/0148315 A1* | 10/2002 | Mittendorf | F16H 1/16 74/409 |
| 2004/0020320 A1 | 2/2004 | Ohsawa | |
| 2012/0194018 A1 | 8/2012 | Miyauchi et al. | |

FOREIGN PATENT DOCUMENTS

| | | |
|---|---|---|
| TW | I296223 | 5/2008 |
| TW | 201033501 A | 9/2010 |
| TW | 201238706 A | 10/2012 |
| TW | 201241340 A | 10/2012 |
| TW | 201242224 A | 10/2012 |

OTHER PUBLICATIONS

Yin; Profile Design of Globoidal Indexing Cam Mechanism with Drum Roller; Journal of Machine Design ; 2002; p. 2.

Lo; Research on the Correction of Motion Curve and Interpolation Technology of Globoid Indexing Cam; Shaanxi University of Science & Technology; 2008.

Liu; Research on Structure of CNC Grinding Machine Specializing in the Globoidal Indexing Cam; Machine Tool & Hydraulics; 2009.

Chen et al.; Research on Machining Method for Cambered Cam; Shaanxi University of Science & Technology; 2009.

Kao; Research on Numerical Control Processing Algoiuthm of Globoid Cam; Shaanxi University of Science & Technology 2008.

Liu; Research of Globoidal Cam Grinding Processing and Design& Development of the Expert CNC Grinder; Shaanxi University of Science & Technology; 2009.

* cited by examiner

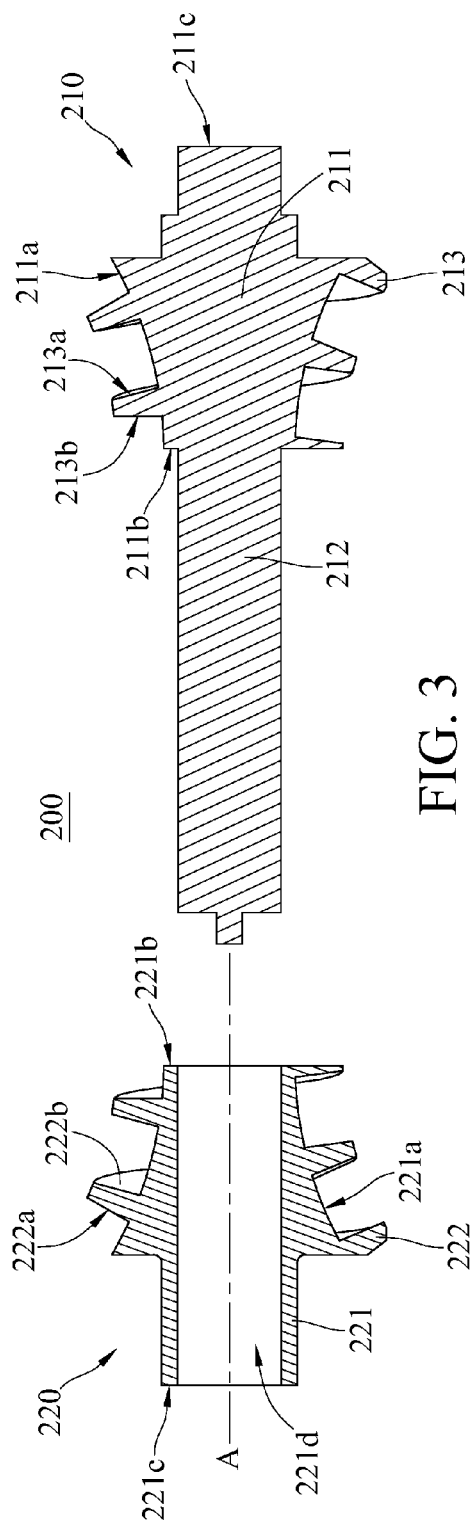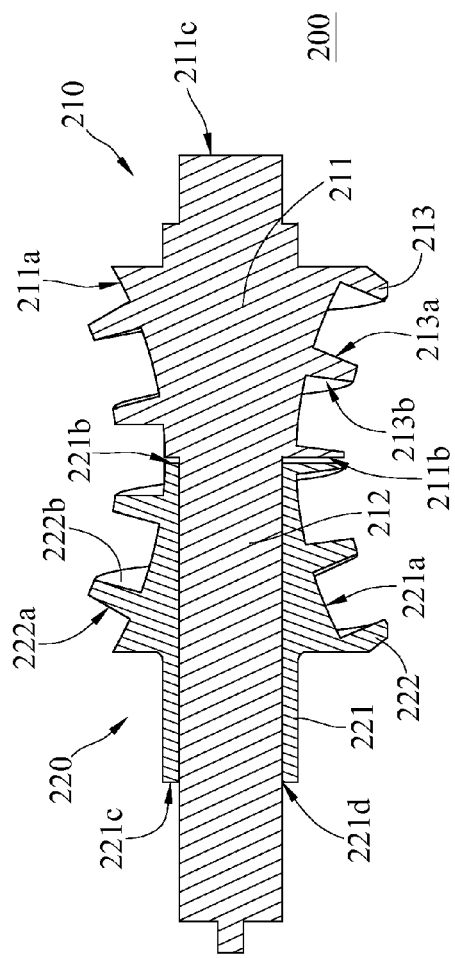
FIG. 3
FIG. 4

COMBINED TRANSMISSION SHAFT AND ROTATING DEVICE HAVING COMBINED TRANSMISSION SHAFT

CROSS-REFERENCE TO RELATED APPLICATIONS

This non-provisional application claims priority under 35 U.S.C. §119(a) on Patent Application No(s). 103135705 filed in Taiwan, R.O.C. on Oct. 15, 2014, the entire contents of which are hereby incorporated by reference.

BACKGROUND

Technical Field

The disclosure relates to a combined transmission shaft and a rotating device having the same.

Background

A follower of a cam (such as a roller gear cam or a parallel index cam) is a turret. A plurality of rollers disposed around a plurality of recesses of the turret is arranged radially with constant intervals. When the cam rotates, the rollers are pressed and driven by the recesses of the cam, thereby rotating the turret.

When the cam is driven with a high speed, the inertia of the cam becomes greater, such that a negative torque is easily generated. If there is a backlash between the cam and the rollers, the cam is vibrated due to an undesirable collision. As a result, the transmission efficiency of the cam is decreased, and the life span of the cam is shortened. Accordingly, it is important to eliminate the backlash between the cam and the rollers.

SUMMARY

One aspect of the disclosure provides a rotating device having a combined transmission shaft which comprises a rotating disc and a combined transmission shaft. The rotating disc comprises a turret and a plurality of driven rollers disposed around the turret. The combined transmission shaft is located at a side of the rotating disc and comprises a first roller gear cam and a second roller gear cam. The first roller gear cam comprises a first shaft, a combined shaft and a first helical tooth. The first shaft has a first outer annular surface with two sides opposite to each other, a first side surface and a second side surface. The first side surface and the second side surface are connected to the two sides of the first outer annular surface respectively. The combined shaft protrudes outward from the first side surface of the first shaft. The first helical tooth is located at the first outer annular surface and has a first outer surface and a first inner surface. The first outer surface is opposite to the first inner surface. The second roller gear cam comprises a second shaft and a second helical tooth. The second shaft has a second outer annular surface with two sides opposite to each other, a third side surface, a fourth side surface and a combination hole. The third side surface and the fourth side surface are connected to the two sides of the second outer annular surface respectively. The second roller gear cam penetrates through the combination hole from the third side surface to the fourth side surface. The second helical tooth is located at the second outer annular surface and has a second outer surface and a second inner surface. The second inner surface is opposite to the second outer surface and faces to the first inner surface. The combined shaft of the first roller gear cam passes through the combination hole of the second roller gear cam. The first roller gear cam is for moving relative to the second roller gear cam, such that the first outer surface of the first helical tooth and the second outer surface of the second helical tooth are pressed against parts of the plurality of driven rollers respectively, or the first inner surface of the first helical tooth and the second inner surface of the second helical tooth are pressed against parts of the plurality of driven rollers respectively.

In another aspect of the disclosure provides a combined transmission shaft which comprises a first roller gear cam and a second roller gear cam. The first roller gear cam comprises a first shaft, a combined shaft and a first helical tooth. The first shaft has a first outer annular surface with two sides opposite to each other, a first side surface and a second side surface. The first side surface and the second side surface are connected to the two sides of the first outer annular surface respectively. The combined shaft protrudes outward from the first side surface of the first shaft. The first helical tooth is located at the first outer annular surface and has a first outer surface and a first inner surface. The first outer surface is opposite to the first inner surface. The second roller gear cam comprises a second shaft and a second helical tooth. The second shaft has a second outer annular surface with two sides opposite to each other, a third side surface, a fourth side surface and a combination hole. The third side surface and the fourth side surface are connected to the two sides of the second outer annular surface respectively. The second roller gear cam penetrates through the combination hole from the third side surface to the fourth side surface. The second helical tooth is located at the second outer annular surface and has a second outer surface and a second inner surface. The second inner surface is opposite to the second outer surface and faces to the first inner surface. The combined shaft of the first roller gear cam passes through the combination hole of the second roller gear cam. The first roller gear cam is for moving relative to the second roller gear cam.

BRIEF DESCRIPTION OF THE DRAWINGS

The disclosure will become more fully understood from the detailed description given herein-below and the accompanying drawings which are given by way of illustration only and thus are not limitative of the disclosure, and wherein:

FIG. 3 is a cross-sectional view of the combined transmission shaft in FIG. 2;

FIG. 4 is a cross-sectional view of the combined transmission shaft in FIG. 2 after being combined;

DETAILED DESCRIPTION

In the following detailed description, for purposes of explanation, numerous specific details are set forth in order to provide a thorough understanding of the disclosed embodiments. It will be apparent, however, that one or more embodiments may be practiced without these specific details. In other instances, well-known structures and devices are schematically shown in order to simplify the drawings.

Figure 1:
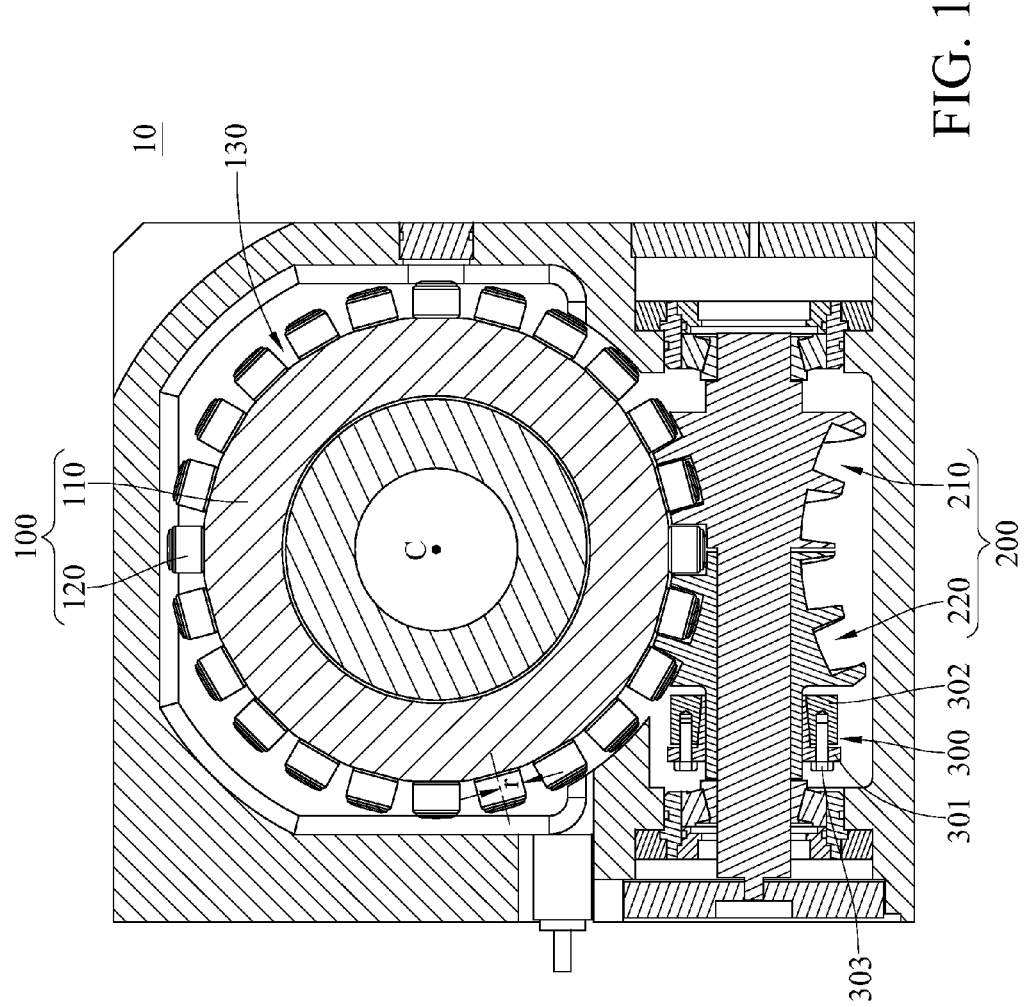
FIG. 1 is a cross-sectional view of a rotating device according to a first embodiment of the disclosure.
Figure 2:
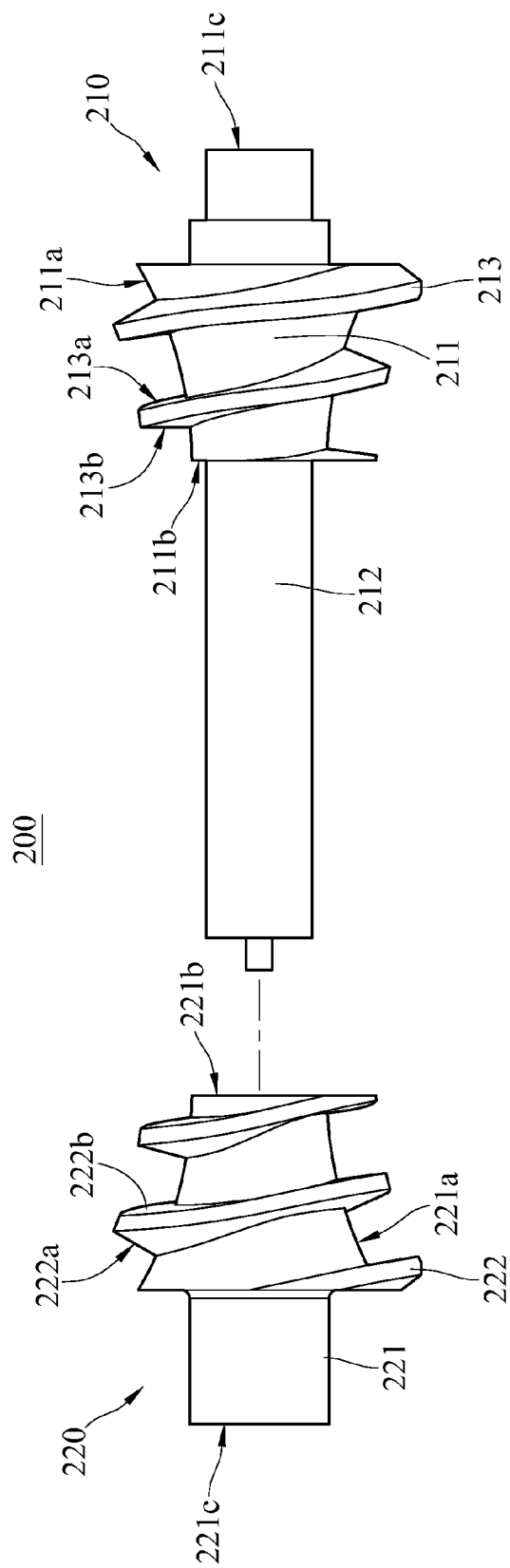
FIG. 2 is an exploded view of a combined transmission shaft in FIG. 1.

Please refer to FIG. 1 through FIG. 4. FIG. 1 is a cross-sectional view of a rotating device according to a first embodiment of the disclosure. FIG. 2 is an exploded view of a combined transmission shaft in FIG. 1. FIG. 3 is a cross-sectional view of the combined transmission shaft in FIG. 2. FIG. 4 is a cross-sectional view of the combined transmission shaft in FIG. 2 after being combined. As shown in FIG. 1, in this embodiment, the rotating device 10 comprises a rotating disc 100, a combined transmission shaft 200 and a shaft coupling 300.

The rotating disc 100 comprises a turret 110 and a plurality of driven rollers 120 disposed around the turret 110 and arranged with constant intervals along a circular path, thereby forming a plurality of recesses 130.

The combined transmission shaft 200 meshes with the rotating disc 100 for rotating the rotating disc 100. As shown in FIG. 2 through FIG. 4, the combined transmission shaft 200 comprises a first roller gear cam 210 and a second roller gear cam 220.

The first roller gear cam 210 comprises a first shaft 211, a combined shaft 212 and a first helical tooth 213. The first shaft 211 has a first outer annular surface 211a with two sides opposite to each other, a first side surface 211b and a second side surface 211c. The first outer annular surface 211a is a curved surface. Additionally, the first outer annular surface 211a bends about a central line C of the turret 110 as a center of curvature relative to an axis of the first shaft 211. The first side surface 211b and the second side surface 211c are connected to the two sides of the first outer annular surface 211a, respectively. The combined shaft 212 protrudes outward from the first side surface 211b of the first shaft 211.

The first helical tooth 213 is located at the first outer annular surface 211a, protrudes outward and radially from the first outer annular surface 211a, and has a first outer surface 213a and a first inner surface 213b. The first outer surface 213a is opposite to the first inner surface 213b, and the first inner surface 213b and the first side surface 211b are facing along the same direction.

The second roller gear cam 220 comprises a second shaft 221 and a second helical tooth 222. The second shaft 221 has a second outer annular surface 221a with two sides opposite to each other, a third side surface 221b, a fourth side surface 221c and a combination hole 221d. The second outer annular surface 221a is a curved surface. Furthermore, the second outer annular surface 221a bends about the central line C of the turret 110 as the center of curvature relative to an axis of the second shaft 221.

The third side surface 221b and the fourth side surface 221c are connected to the two sides of the second outer annular surface 221a, and the third side surface 221b is facing toward the first side surface 211b. The combination hole 221d extends through the second roller gear cam 22 from the third side surface 221b to the fourth side surface 221c. The second helical tooth 222 is located at the second outer annular surface 221a, protrudes outward and radially from the second outer annular surface 221a, and has a second outer surface 222a and a second inner surface 222b. The second inner surface 222b is opposite to the second outer surface 222a and facing the first inner surface 213b. The combined shaft 212 of the first roller gear cam 210 passes through the combination hole 221 of the second roller gear cam 220, and the first roller gear cam 210 is for moving relative to the second roller gear cam 220, such that the first helical tooth 213 and the second helical tooth 222 become closer or farther away from each other.

The shaft coupling 300, such as a keyless coupling, sleeves on both the combined shaft 212 and the second shaft 221. The shaft coupling 300 is a combination of a pressing plate 301, a sleeve 302 and a plurality of screw bolts 303. An upper end of the pressing plate 301 is a flat plate. The center of the pressing plate 301 is a round hole sleeving on the second shaft 221. The flat plate has a plurality of holes. The inner part of the sleeve 302 is combined with a lower end of the outer part of the pressing plate 301 to form a cone-shaped structure. An end of the sleeve and the upper end of the pressing plate 301 are spaced apart by an interval. When the sleeve 302 is affixed to the screw bolts 303 through the plurality of holes of the pressing plate 310, the combined shaft 212 of the first roller gear cam 201 is pressed against the second shaft 221 of the second roller gear cam 220, thereby preventing the first roller gear cam 210 from sliding along an extending direction of an axis of the second roller gear cam 220 relative to the second roller gear cam 220.

In this embodiment, the combination method of the combined transmission shaft 200 is described as follows.

First, the combined transmission shaft 200 is meshed with the rotating disc 100 when the shaft coupling 300 is loose, such that the first roller gear cam 210 and the second roller gear cam 220 can move relative to each other.

Then, a relative position of the first roller gear cam 210 and the second roller gear cam 220 is adjusted. When the first outer surface 213a of the first helical tooth 213 and the second outer surface 222a of the second helical tooth 222 are in contact with the driven rollers 120 respectively, the relative position of the first roller gear cam 210 and the second roller gear cam 220 is fixed by the shaft coupling 300.

Figure 5:
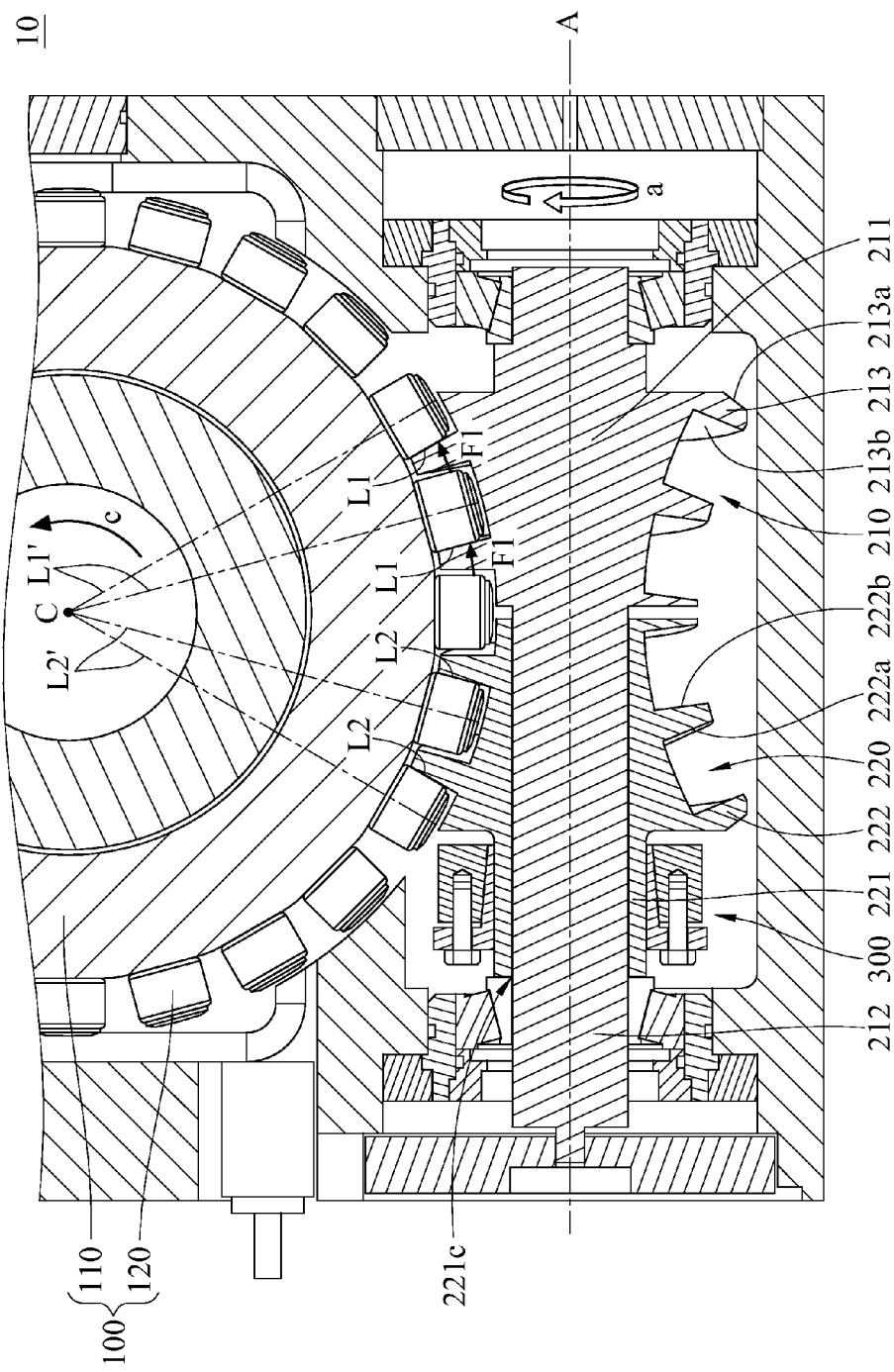
FIG. 5 is a partially cross-sectional view of the combined transmission shaft in FIG. 1 which rotates along a first direction during operation.
Figure 6:
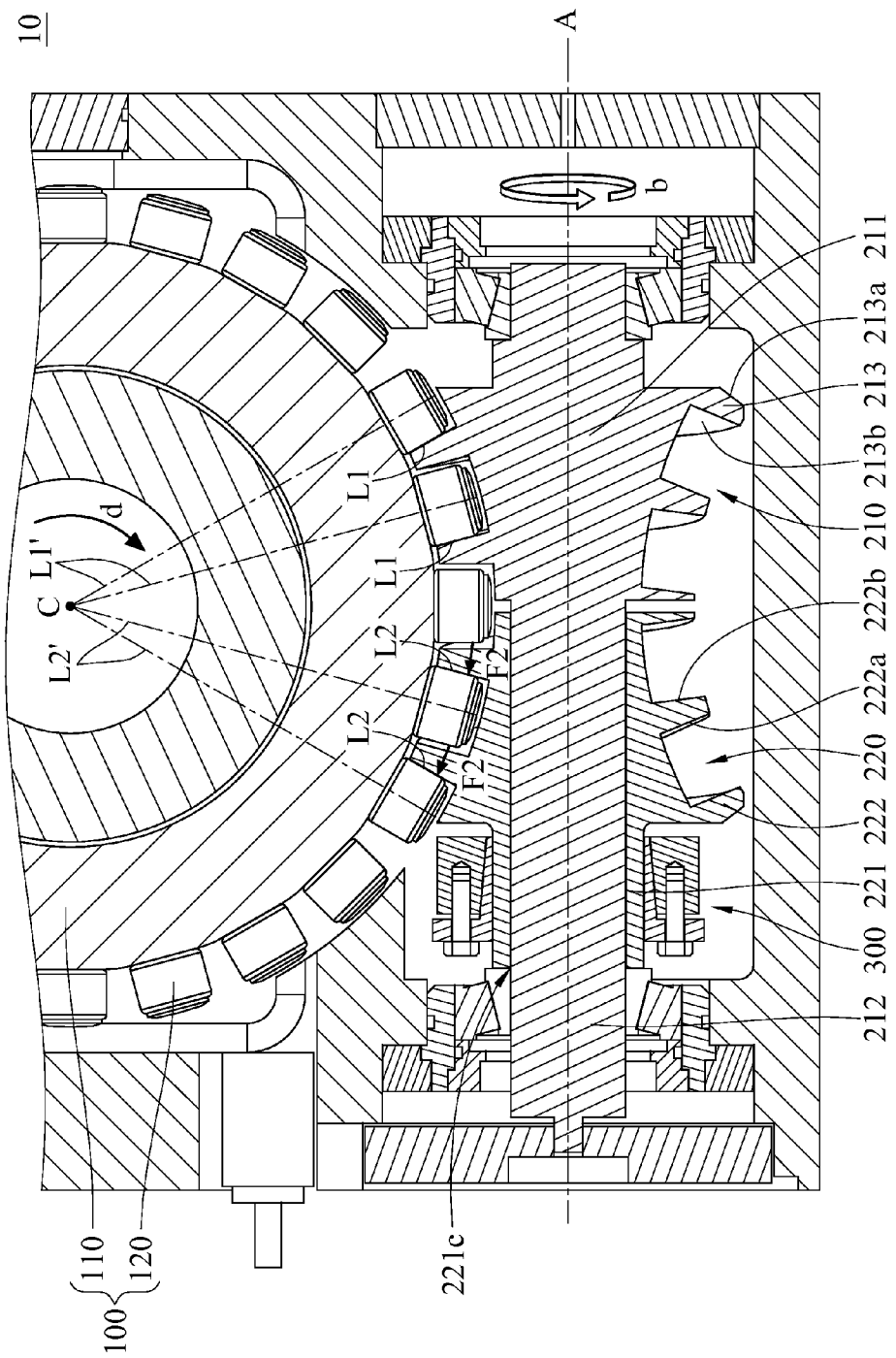
FIG. 6 is a partially cross-sectional view of the combined transmission shaft in FIG. 1 which rotates along a second direction during operation.

Please refer to FIG. 5 and FIG. 6. FIG. 5 is a partially cross-sectional view of the combined transmission shaft in FIG. 1 which rotates along a first direction during operation. FIG. 6 is a partially cross-sectional view of the combined transmission shaft in FIG. 1 which rotates along a second direction during operation. As shown in FIG. 5 and FIG. 6, the first outer surface 213a of the first helical tooth 213 and the second outer surface 222a of the second helical tooth 222 of are in contact with the driven rollers 120, thereby forming a plurality of first contact lines L1 and a plurality of second contact lines L2, respectively. The first contact lines L1 and the second contact lines L2 are shifted outward respectively and extended to be intersected at an intersection point. The intersection point is a point of the central line C of the turret 110. Being shifted outward means that the first contact lines L1 and the second contact lines L2 are shifted outward to centers of their own driven rollers 120, respectively. That is to say, the first contact lines L1 is shifted along a radial direction of each driven roller 120 farther away from the second roller gear cam 220 and the second contact lines L2 is shifted along the radial direction of each driven roller 120 farther away from the first roller gear cam 210.

Since the first outer surface 213a of the first helical tooth 213 and the second outer surface 222a of the second helical tooth 222 are in contact with the driven rollers 120 respectively, there is no backlash generated between the combined transmission shaft 200 and the rotating disc 100. Accordingly, when the combined transmission shaft 200 rotates along a first direction (indicated by an arrow a, as shown in FIG. 5), a counterclockwise pressing force F1 is generated since the driven roller 120 of the rotating disc 100 is pressed against the first helical tooth 213 of the first roller gear cam 210, thereby smoothly rotating the rotating disc 100 (along a direction indicated by an arrow c). Additionally, when the combined transmission shaft 200 rotates counterclockwise along a second direction (indicated by an arrow b, as shown in FIG. 6), a clockwise pressing force F2 is generated since the driven roller 120 of the rotating disc 100 is pressed against the second helical tooth 222 of the second roller gear cam 220, thereby smoothly rotating the rotating disc 100 (along a direction indicated by an arrow d).

Figure 7:
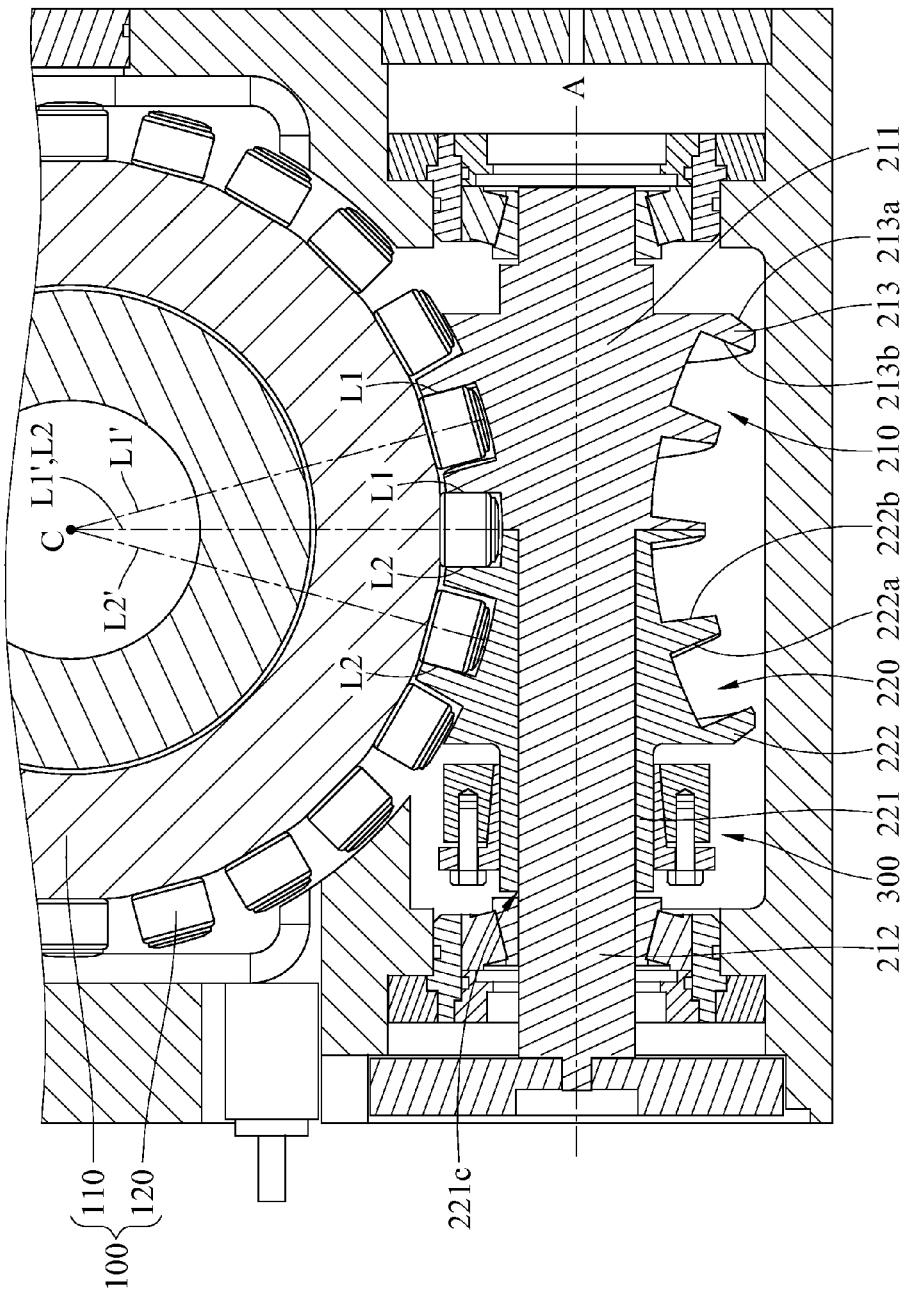
FIG. 7 is a cross-sectional view of a rotating device according to a second embodiment of the disclosure.

However, the first contact lines L1 and the second contact lines L2 are, but not limited to, formed when the first outer surface 213a of the first helical tooth 213 and the second outer surface 222a of the second helical tooth 222 of are in contact with the driven rollers 120 in FIG. 5. The following describes another embodiment of the disclosure. Pleases refer to FIG. 7 which is a cross-sectional view of a rotating device according to a second embodiment of the disclosure.

In this embodiment, the first inner surface 213b of the first helical tooth 213 and the second inner surface 222b of the second helical tooth 222 are in contact with the driven rollers 120, thereby forming the first contact line L1 and the second contact line L2. The operation method of the rotating device 10 in this embodiment is the same as the first embodiment, such that it will not be repeated in this embodiment.

Figure 8:
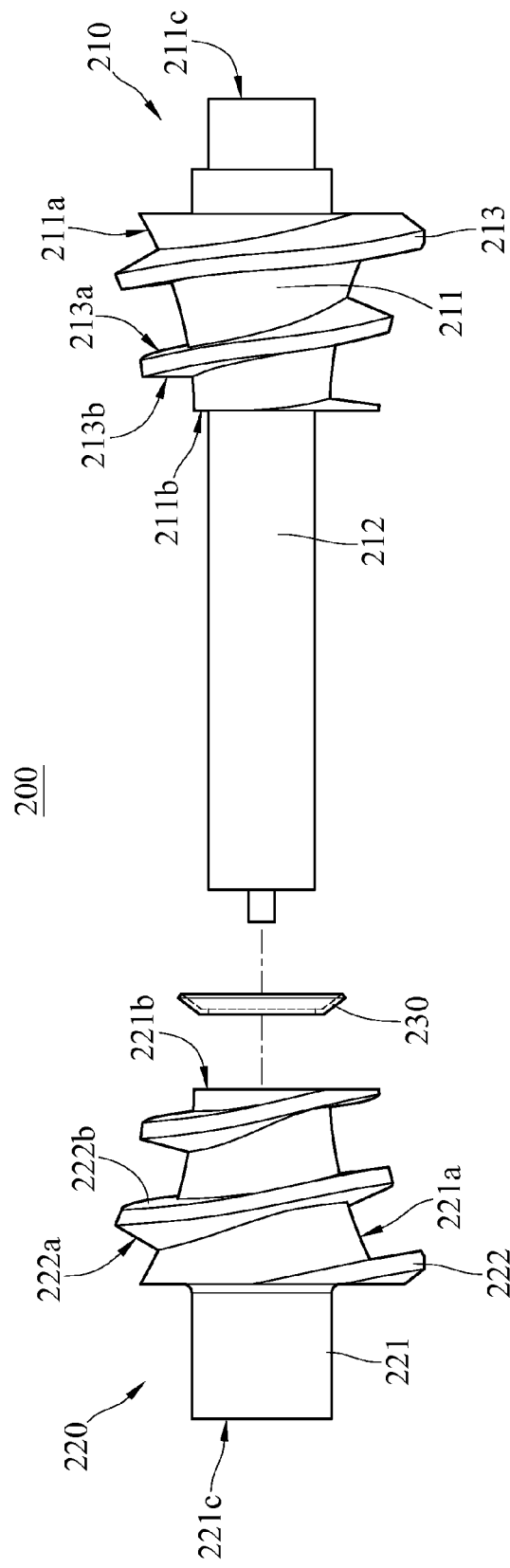
FIG. 8 is a cross-sectional view of a rotating device according to a third embodiment of the disclosure.

Please refer to FIG. 8 which is a cross-sectional view of a rotating device according to a third embodiment of the disclosure. In this embodiment, the combined transmission shaft 200 further comprises an elastic component 230. The elastic component 230, for example, is a spring or a reed. The spring, such as a disc-shaped spring, a dish-shaped spring or a C-shaped spring, is interposed between the first side surface 211b of the first shaft 211 and the third side surface 221b of the second shaft 221. The advantage of the elastic component 230 is that the first roller gear cam 210 and the second roller gear cam 220 are pushed outward due to the elasticity of the elastic component 230, for fixing the first roller gear cam 210 and the second roller gear cam 220. Accordingly, the combined transmission shaft 200 meshes with the rotating disc 100 tightly, to improve the transmission efficiency and the life span of the cam with backlash in the prior art.

According to the combined transmission shaft and the rotating device having the same as the disclosure, the first roller gear cam and the second roller gear cam can be combined together to form the whole transmission shaft, such that the first roller gear cam and the second roller gear cam can slide along an axial direction for adjusting the relative positions of the first roller gear cam and the second roller gear cam. When the first outer surface of the first helical tooth and the second outer surface of the second helical tooth of are in contact with the driven rollers respectively, the combined transmission shaft can either drive the rotating disc to rotate clockwise by the first helical tooth of the first roller gear cam or rotate counterclockwise by the second helical tooth of the second roller gear cam. Accordingly, the backlash in the prior art is removed, and the transmission efficiency and the life span of the cam are improved.

The disclosure will become more fully understood from the said embodiment for illustration only and thus does not limit the disclosure. Any modifications within the spirit and category of the disclosure fall in the scope of the disclosure.

What is claimed is:

1. A rotating device having a combined transmission shaft, comprising:

a rotating disc comprising a turret and a plurality of driven rollers disposed around the turret; and
a combined transmission shaft located at a side of the rotating disc further comprising:
a first roller gear cam further comprising a first shaft, a combined shaft and a first helical tooth, the first shaft having a first outer annular surface with two sides opposite to each other, a first side surface and a second side surface, the first side surface and the second side surface being connected to the two sides of the first outer annular surface respectively, the combined shaft protruding outward from the first side surface of the first shaft, the first helical tooth being located at the first outer annular surface and having a first outer surface and a first inner surface, and the first outer surface being opposite to the first inner surface; and
a second roller gear cam further comprising a second shaft and a second helical tooth, the second shaft having a second outer annular surface with two sides opposite to each other, a third side surface, a fourth side surface and a combination hole, the third side surface and the fourth side surface being connected to the two sides of the second outer annular surface respectively, the combination hole extending through the second roller gear cam from the third side surface to the fourth side surface, the second helical tooth being located at the second outer annular surface and having a second outer surface and a second inner surface, the second inner surface being opposite to the second outer surface and facing to the first inner surface, the combined shaft of the first roller gear cam passing through the combination hole of the second roller gear cam, and the first roller gear cam being for moving relative to the second roller gear cam, such that the first outer surface of the first helical tooth and the second outer surface of the second helical tooth are pressed against parts of the plurality of driven rollers respectively, or the first inner surface of the first helical tooth and the second inner surface of the second helical tooth are pressed against parts of the plurality of driven rollers respectively.

2. The rotating device having the combined transmission shaft according to claim 1, wherein the plurality of driven rollers is arranged with constant intervals along a circular path, axes of the plurality of driven rollers are intersected at an axial center of the turret, the first outer surface of the first helical tooth and the second outer surface of the second helical tooth are pressed against the parts of the driven rollers, thereby forming a plurality of first contact lines and a plurality of second contact lines along a radial direction respectively, and the plurality of first contact lines and the plurality of second contact lines are shifted inward to centers of the driven rollers respectively and extended to be intersected at an intersection point.

3. The rotating device having the combined transmission shaft according to claim 2, wherein the intersection point is located at the axial center of the turret.

4. The rotating device having the combined transmission shaft according to claim 1, wherein the plurality of driven rollers are arrayed with constant intervals along a circular path, axes of the plurality of driven rollers are intersected at an axial center of the turret, the first inner surface of the first helical tooth and the second inner surface of the second helical tooth are pressed against the parts of the driven rollers thereby forming a plurality of first contact lines and a plurality of second contact lines respectively, and the plurality of first contact lines and the plurality of second contact lines are shifted outward to centers of the driven rollers respectively and extended to be intersected at an intersection point.

5. The rotating device having the combined transmission shaft according to claim 4, wherein the intersection point is located at the axial center of the turret.

6. The rotating device having the combined transmission shaft according to claim 1, wherein the first outer annular surface is a curved surface and bends about a central line of the turret as a center of curvature relative to an axis of the first shaft, and the second outer annular surface is a curved surface and bends about the central line of the turret as a center of curvature relative to an axis of the second shaft.

7. The rotating device having the combined transmission shaft according to claim 1, further comprising a shaft coupling which sleeves on the second shaft.

8. The rotating device having the combined transmission shaft according to claim 7, wherein the shaft coupling is a keyless coupling.

9. The rotating device having the combined transmission shaft according to claim 7, wherein the shaft coupling is a combination of a pressing plate, a sleeve and a plurality of screw bolts.

10. The rotating device having the combined transmission shaft according to claim 9, wherein an upper end of the pressing plate is a flat plate, the center of the pressing plate is a round hole sleeving on the second shaft, the flat plate has a plurality of holes, the inner part of the sleeve is combined with a lower end of the outer part of the pressing plate to form a cone-shaped structure, and an end of the sleeve and the upper end of the pressing plate are spaced apart by an interval.

11. The rotating device having the combined transmission shaft according to claim 9, wherein when the sleeve is affixed to the plurality of screw bolts through the plurality of holes of the pressing plate, the combined shaft of the first roller gear cam is pressed against the second shaft of the second roller gear cam, thereby preventing the first roller gear cam from sliding along an extending direction of an axis of the second roller gear cam relative to the second roller gear cam.

12. The rotating device having the combined transmission shaft according to claim 9, wherein the combined transmission shaft further comprises an elastic component interposed between the first side surface of the first shaft and the third side surface of the second shaft.

13. A combined transmission shaft, comprising:
a first roller gear cam further comprising a first shaft, a combined shaft and a first helical tooth, the first shaft having a first outer annular surface with two sides opposite to each other, a first side surface and a second side surface, the first side surface and the second side surface being connected to the two sides of the first outer annular surface respectively, the combined shaft protruding outward from the first side surface of the first shaft, the first helical tooth being located at the first outer annular surface and having a first outer surface and a first inner surface, and the first outer surface being opposite to the first inner surface; and a second roller gear cam further comprising a second shaft and a second helical tooth, the second shaft having a second outer annular surface with two sides opposite to each other, a third side surface, a fourth side surface and a combination hole, the third side surface and the fourth side surface being connected to the two sides of the second outer annular surface respectively, the combination hole extending through the second roller gear cam from the third side surface to the fourth side surface, the second helical tooth being located at the second outer annular surface and having a second outer surface and a second inner surface, the second inner surface being opposite to the second outer surface and facing to the first inner surface, the combined shaft of the first roller gear cam passing through the combination hole of the second roller gear cam, and the first roller gear cam being for moving relative to the second roller gear cam.

14. The combined transmission shaft according to claim 13, further comprising an elastic component interposed between the first side surface of the first shaft and the third side surface of the second shaft.

15. The rotating device having the combined transmission shaft according to claim 13, further comprising a shaft coupling which sleeves on the second shaft.

16. The rotating device having the combined transmission shaft according to claim 15, wherein the shaft coupling is a keyless coupling.

17. The rotating device having the combined transmission shaft according to claim 15, wherein the shaft coupling is a combination of a pressing plate, a sleeve and a plurality of screw bolts.

18. The rotating device having the combined transmission shaft according to claim 17, wherein when the sleeve is affixed to the plurality of screw bolt through the plurality of holes of the pressing plate, the combined shaft of the first roller gear cam is pressed against the second shaft of the second roller gear cam, thereby preventing the first roller gear cam from sliding along an extending direction of an axis of the second roller gear cam relative to the second roller gear cam.

19. The rotating device having the combined transmission shaft according to claim 17, wherein an upper end of the pressing plate is a flat plate, the center of the pressing plate is a round hole sleeving on the second shaft, the flat plate has a plurality of holes, the inner part of the sleeve is combined with a lower end of the outer part of the pressing plate to form a cone-shaped structure, and an end of the sleeve and the upper end of the pressing plate are spaced apart by an interval.

20. The rotating device having the combined transmission shaft according to claim 19, wherein, when the sleeve is affixed to the plurality of screw bolts through the plurality of holes of the pressing plate, the combined shaft of the first roller gear cam is pressed against the second shaft of the second roller gear cam, thereby preventing the first roller gear cam from sliding along an extending direction of an axis of the second roller gear cam relative to the second roller gear cam.

* * * * *